May 12, 1931.  R. S. BURDETTE  1,805,036
EXTENSION FELLY
Filed Jan. 29, 1926  2 Sheets-Sheet 1

Inventor
Richard S. Burdette.
By OEBee
Attorney

May 12, 1931.  R. S. BURDETTE  1,805,036
EXTENSION FELLY
Filed Jan. 29, 1926    2 Sheets-Sheet 2
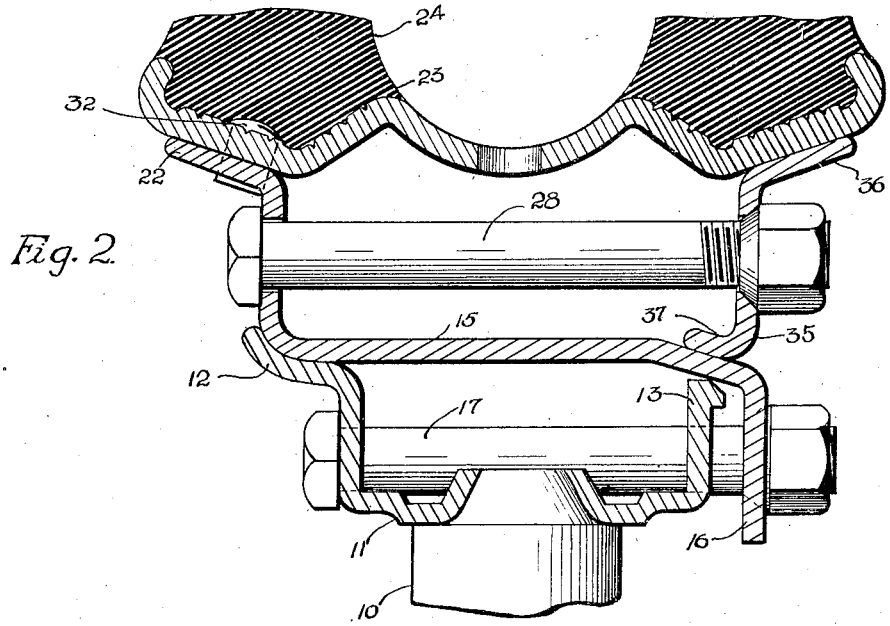
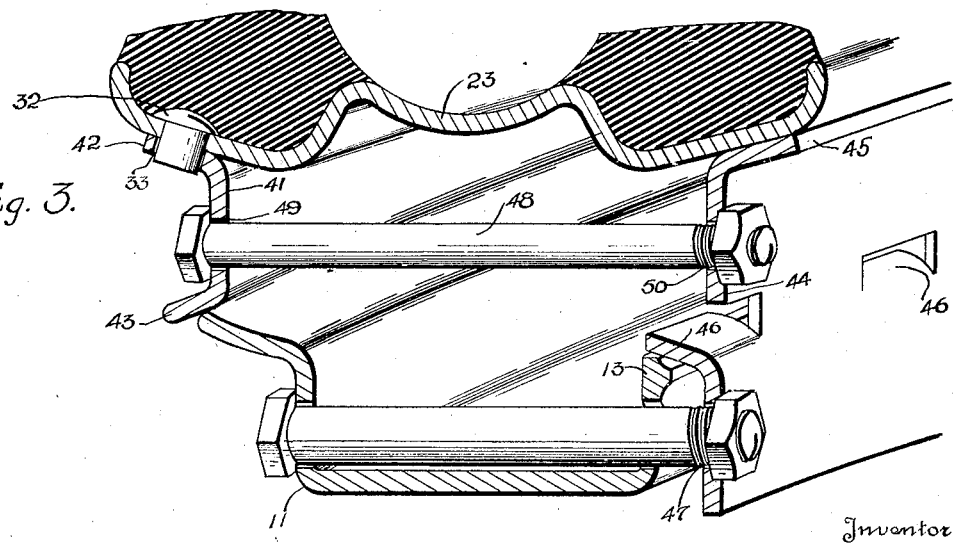
Inventor
Richard S. Burdette.
By
Attorney Patented May 12, 1931

1,805,036

UNITED STATES PATENT OFFICE

RICHARD S. BURDETTE, OF AKRON, OHIO, ASSIGNOR TO THE GOODYEAR TIRE & RUBBER COMPANY, OF AKRON, OHIO, A CORPORATION OF OHIO

EXTENSION FELLY

Application filed January 29, 1926. Serial No. 84,587.

My invention relates to extension fellies and it has particular reference to a device by means of which a solid tire may be mounted upon a wheel adapted to receive a pneumatic tire.

Most types of passenger automobiles and small motor trucks are provided with wheels adapted to receive pneumatic tires, and they are so dimensioned that the over-all diameter of the wheel and inflated tire bears a definite relation to the gear ratios of the transmission system. Many motorists prefer to employ solid or cushion rubber tires, especially when the car must be operated for an extended length of time over roads in poor condition, but heretofore they have been deterred from effecting a change of tires, inasmuch as the fellies of wheels designed for the reception of pneumatic tires are not adapted to receive solid tires. Since pneumatic tires are usually of greater cross-sectional diameter than the corresponding size of solid tires, the transfer also results in an alteration of the desired gear ratio. If the change is effected by procuring a set of properly dimensioned wheels having fellies adapted to receive solid tires, the cost is excessive when compared with the results obtained.

The objects of the invention are to provide a device by means of which a solid tire may be mounted readily upon a wheel having a felly adapted to receive a rim for a pneumatic tire, and in so proportioning its diameter that the gear ratios are not materially altered. It is also intended to provide a structure which is durable, inexpensive and which maintains the tire in correct alignment upon the wheel. In a general aspect, these objectives are realized by the provision of an annular member, that may be disposed upon the felly of a wheel adapted to receive a pneumatic tire, having upstanding portions arranged to receive the base band of a solid tire and an inwardly projecting portion by means of which the improvement may be secured to the wheel.

In the drawings:

Fig. 2 is a cross-sectional view of an assembly, including a modified form of the invention; and Fig. 3 is a fragmentary perspective view of an assembly incorporating another modification.

Figure 1:
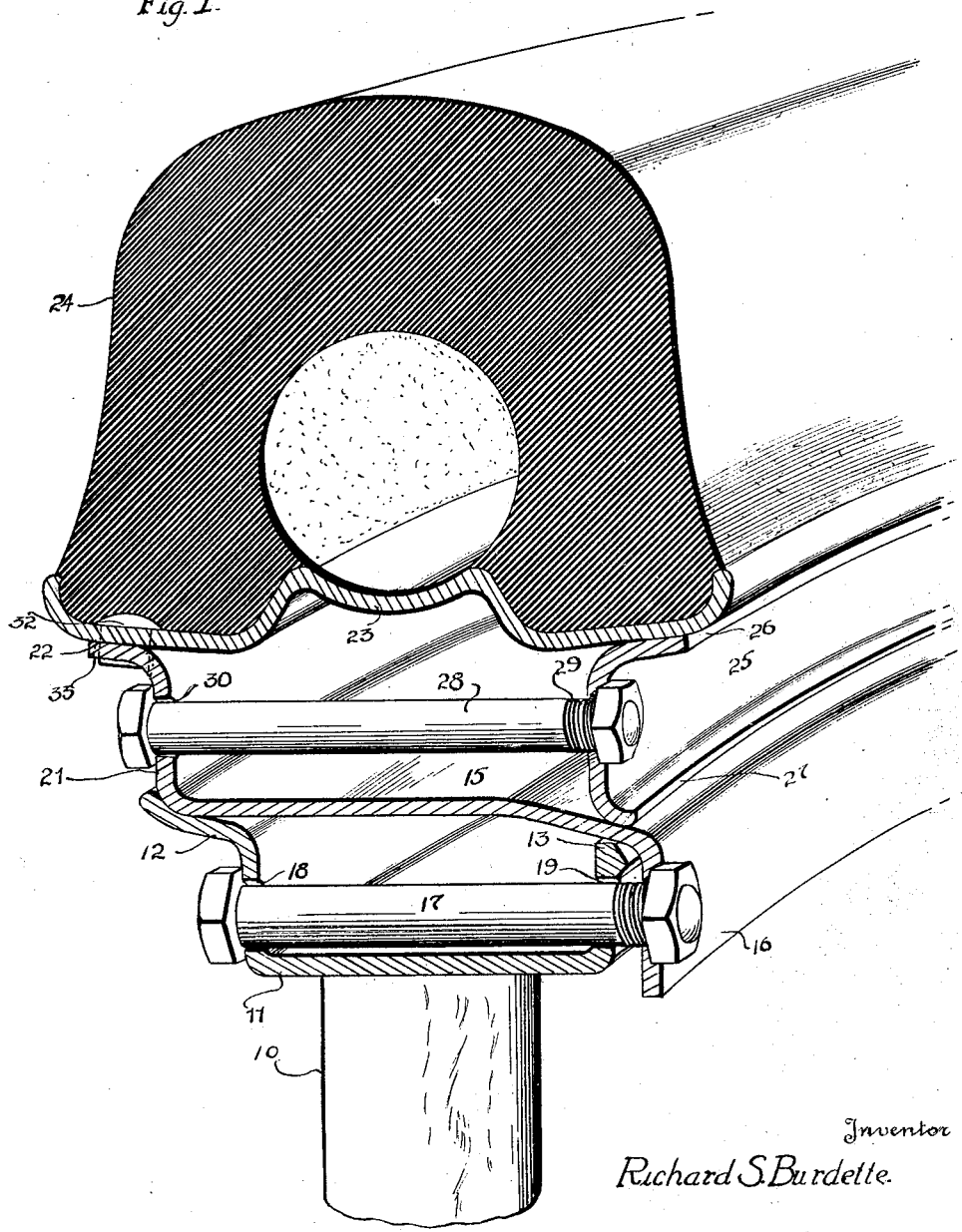
Fig. 1 is a fragmentary perspective view of a wheel having a solid tire secured thereto by means of a preferred embodiment of the invention.

The assembly shown in Fig. 1 comprises a wheel 10, provided with a felly 11 of standard make, having an upwardly and outwardly projecting flange 12 and an upright portion 13, constructed to receive a rim having a pneumatic tire secured thereto. An annular metal member 15, of sufficient width to bear against the outwardly projecting portion of the flange 12 and on the outer periphery of the flange 13, is provided with an inwardly projecting portion 16, formed with a suitable number of apertures for the reception of bolts 17, that pass through aligned apertures 18 and 19 in the flanges of the felly 11, and provide a means for securing the member 15 thereto.

The opposite side of the annular member is provided with an upstanding flange 21 having an outwardly flared portion 22 forming a seat for the outer portion of the base band 23 of a cushion tire 24. The opposite portion of the tire is supported by an annular channeled member 25, disposed above the flange 13 of the felly 11, having a flange 26 adapted to contact with the base band, and another flange 27 bearing against the surface of the member 15. The member 25 is positioned by means of bolts 28, passing through apertures 29 formed therein, and aligned apertures 30 formed in the flange 21 of the annular member 15.

The base band 23 may be provided with a plurality of lugs 32 that project into apertures 33 formed on the flange 22 of the member 15, although these elements need not be included, as the flanges 22 and 26 may be given sufficient taper to prevent lateral displacement of the tire. The extension felly, comprising the parts 15 and 25 rigidly secured to each other and to the tire by proper tension exerted on the bolts 28, may be applied readily to the felly 11 of the wheel, by sliding the member 15 over the flanges 12 and 13, and it may be readily secured in place by tightening the nuts on the bolts 17.

It will be observed that the extension felly may be readily fabricated in a rolling mill, that it provides a durable structure which may be applied to a standard type of pneumatic tire rim felly, and that its width may be so dimensioned that the over-all diameter of the wheel with a solid tire mounted thereon is equal to the over-all diameter obtained with a standard pneumatic tire. A decided advantage is gained by supporting the tire at the outer portions of the base band, inasmuch as with this construction, a high resistance is offered to rotational forces tending to displace the tire about the hub of the wheel.

The extension felly shown in Fig. 2 differs primarily from that shown in Fig. 1 in the construction of the annular member 25. In the modified form, an annular member 35 is provided with an outwardly projecting flange portion 36, adapted to support the base band of the tire, and with an inwardly projecting flange 37 properly formed to bear against the annular member 15. The flange 37 may be made of any desired width and, thus, a greater bearing surface may be obtained than that possible with the outwardly projecting flange 27 provided on the annular member 25.

The extension felly shown in Fig. 3 comprises an annular member 41, having an outwardly projecting flange 42 adapted to contact with the base band of the tire, and to interlock therewith by means of the lugs 32, formed in the base band, that project into apertures 33 formed in the flange 42. The opposite end of the member 41 is also provided with an outward flare, to form a flange 43 that overhangs and contacts with the adjacent edge of the flange 12. The opposite side of the tire 24 is supported by means of an annular member 44, having an outwardly projecting flange 45 at one edge thereof adapted to contact with the base band of the tire, and a series of inwardly projecting lugs 46, constructed to bear against the flange 13 of the felly 11. The lugs are formed by cutting through the member 44 at spaced points and pressing the severed portions inwardly. Bolt holes 47 are provided in the member 44, for the reception of the bolts 17 which secure the member 44 to the wheel. The two annular members 41 and 44 are rigidly secured to each other and in fixed relation to the tire 24, by means of bolts 48 extending between aligned apertures 49 and 50. This type of extension felly may be employed where a minimum weight consistent with a proper durability is required. The felly has a maximum rigidity, inasmuch as a full circle bearing is obtained at either side of the tire, in a manner similar to that provided in the modifications shown in Figs. 1 and 2.

From the foregoing description it will be apparent that other modifications will readily suggest themselves to those skilled in the art, and that the invention should not be limited to the exact structural details described herein, but should be limited only by the scope of the following claims.

What I claim is:

1. The combination with a wheel felly provided with seating surfaces for a tire-carrying rim, of an annular member demountably secured upon the seating surfaces for supporting one edge portion of a tire carrying band of greater internal diameter than the rim and a removable ring for supporting the opposite edge portion of the base band.

2. The combination with a wheel felly provided with seating surfaces for a pneumatic tire-carrying rim and a tire carrying band, of an annular member provided with an outwardly radially projecting flanged portion adapted to support one edge portion of the band, said band having a greater internal diameter than the rim and an inwardly radially projecting flanged portion on the annular member and formed with means to demountably position the annular member upon the felly and a second annular member demountably positioned intermediate the band and the first mentioned member to demountably retain the band upon the members.

3. The combination with a wheel felly provided with seating surfaces for a pneumatic tire-carrying rim and a tire carrying band, of an annular member disposed upon the felly and provided with an outwardly radially projecting flange for supporting one edge portion of the band, said band having a greater internal diameter than the rim, an inwardly radially projecting flange on the annular member and formed with means for demountably securing the annular member upon the felly, and a second annular member interposed between the opposite edge portion of the band and the first mentioned annular member, and means to secure the annular members in fixed relation to demountably secure the band thereon.

In witness whereof, I have hereunto signed my name.

RICHARD S. BURDETTE.